June 10, 1952          L. SAIVES          2,600,269
DEVICE FOR AUTOMATIC POWER TRANSMISSION
Filed Dec. 7, 1950
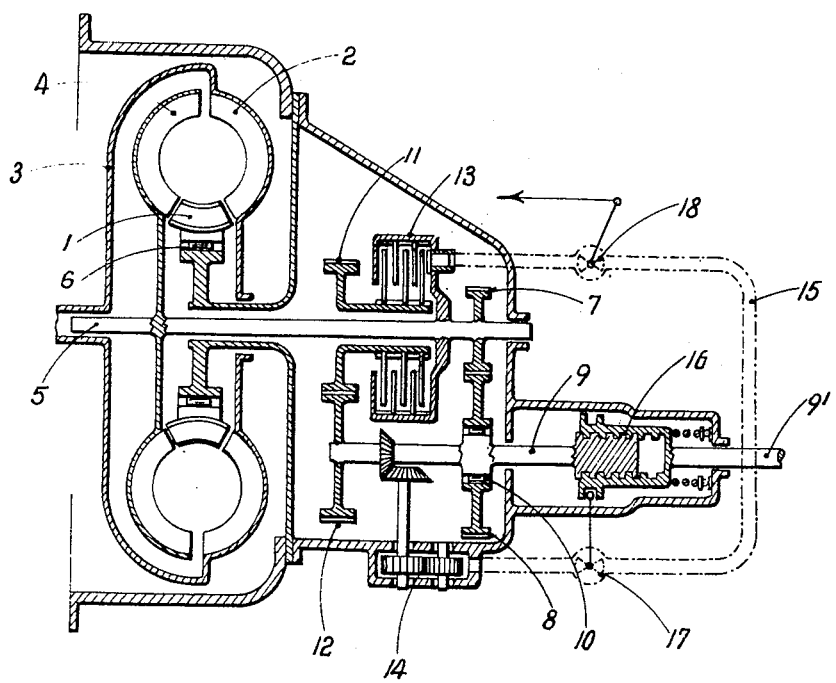
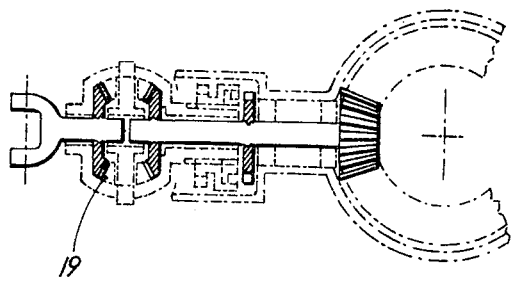
INVENTOR
LÉON SAIVES
BY *Robert E. Burns*
ATTORNEY Patented June 10, 1952

2,600,269

UNITED STATES PATENT OFFICE 2,600,269

DEVICE FOR AUTOMATIC POWER TRANSMISSION

Leon Saives, Billancourt, France, assignor to Regie Nationale des Usines Renault, Billancourt, France Application December 7, 1950, Serial No. 199,621
In France January 18, 1950

4 Claims. (Cl. 74—731)

This invention relates to a device for automatic power transmission which is more particularly applicable to the transmission of automobile vehicles and is constituted in its constructional realization by a torque converter of known type coupled to a mechanical transmission comprising for preference two speed combinations.

The elements of the torque converter are connected to the speed changing apparatus in such manner that the shaft driven by the turbine of the torque converter carries two pinions one of which is in mesh with another pinion keyed on the shaft that takes the drive to the wheels, which is situated underneath the shaft issuing from the torque converter and consequently not in line with the latter which enables a suitable gear reduction ratio to be obtained. The shaft issuing from the converter carries in addition a pinion, loosely mounted, which meshes with another pinion keyed to the driven shaft and which can be coupled to its carrying shaft by means of a multiple disc clutch operated by the oil pressure of a pump actuated by the driven shaft, this oil pressure varying with the speed of the vehicle. A throttle-valve in the oil pipe line is operated by a regulator sensitive to the torque exerted on the transmission shaft, in such manner that a loss of head is introduced in the pipe line and the coupling of the driving pinion is disengaged when the torque becomes too great. In addition, free wheels are mounted on the hub of the stator of the torque converter and on the hub of the reduction pinion carried on the driven shaft.

The device enables the driven shaft to be offset with regard to the engine shaft, which presents advantages for underslinging the floor of the vehicles, in cases where a transmission shaft is used and also for the simple provision of engine propulsive units right at the front and right at the rear.

The device forming the subject of the invention admits of a particularly simple combination of members, to obtain the automatic control of the mechanical transmission coupled to the hydraulic converter. This mechanical transmission is such that it is never possible for the torque applied by the engine unit to the driven shaft to be interrupted.

In the accompanying drawing:

Figure 1 is a diagrammatic view of a transmission device in accordance with the invention.

Figure 2 represents the reversing apparatus coupled to the transmission device.

The torque converter, of known type, comprises a stator 1, a pump 2 rigidly locked by the casing 3 of the engine shaft (not shown), and a turbine 4 keyed to the shaft 5. The stator 1 is mounted on a free wheel 6. On the shaft 5 the pinion 7 of the reduction gear is fixed and this pinion 7 is in mesh with a pinion 8 mounted on a secondary shaft 9 through the intermediary of a free wheel 10. An identical pair of pinions 11, 12 are arranged in the following manner. The pinion 11 is loose on the shaft 5 and can be locked to this shaft by a multiple plate clutch 13, whereas the pinion 12 is solid with the shaft 9. An oil pump 14 driven by the shaft 9 can cause the pressure in the pipe line 15 to be varied, as a function of the speed of this shaft, and bring into contact the plates of the clutch 13 starting from a given pressure determined by an opposing spring (not shown).

A screw and spring regulator 16 sensitive to the torque exerted on the transmission shaft $9^1$ operates a rotary valve 17 fitted in the pipe line 15.

Another rotary valve 18 can be directly operated by the driver through suitable controls.

The delivery valves and turning joints required for the functioning of the hydraulic circuit are not shown on the basic diagram.

The apparatus operates in the following manner.

The reversing gear can be made of a set of bevel gears 19 or any other suitable device, and only comes into play for reversing purposes (Fig. 2).

The slow running of the engine is adjusted so that the vehicle is not driven by the hydraulic converter.

When the accelerator pedal is depressed, the hydraulic converter drives the shaft 5 and consequently the pinion 7 and the free wheel pinion 10, which drives the shaft 9 with a reduction equal to the product of that of the converter by that of the reduction gear.

Accordingly as the speed of the vehicle increases, the pressure in the oil circuit increases, until the clutch 13 is operated, which eliminates the mechanical reduction. The pinion 11 is locked to the shaft 5, and drives the pinion 12 and the shaft 9. This latter acquiring an angular velocity greater than that of pinion 8, the free wheel 10 comes into play.

Simultaneously, the slip, and consequently the torque reduction in the hydraulic apparatus is reduced.

The mechanical reduction is eliminated only if the torque required by the transmission shaft for propelling the vehicle has sufficiently decreased.

The regulator is sensitive to the torque exerted on the transmission shaft $9^1$ and induces by operating the rotary valve 17 a loss of head in the pipe line 15, which tends to reduce the pressure on the clutch plates 13.

The reduction comes into action again if the torque increases in course of travel.

The speed of the vehicle continuing to increase, the hydraulic converter functions with less and less slip, until the component on the reaction member having changed direction, the converter functions as a simple coupling, owing to the free-wheel in the reaction unit. There is then only very slight slip, and the transmission is similar to a direct drive.

The driver can re-engage at will the mechanical reduction, by operating the rotary valve 18 when he desires exceptional acceleration.

A particularly simple device is thus obtained which permits the transmission shaft to be dropped. The apparatus renders absolutely impossible any interruption of the application of the driving force to the driven shaft while travelling and ensures progressive passing from one mechanical reduction to the other, by the slipping of the multiple plate clutch.

The continuity of the application of the force and the progressiveness of the changing of the reduction gear are obtained by much less costly methods than in the device usually employed, in particular in devices with epicyclic gear trains, which moreover necessitate the use of coaxial input and output shafts.

I claim:

1. An automatic variable speed transmission comprising a primary driving shaft, a secondary shaft parallel to said primary shaft, a gear reductor interposed between said primary shaft and said secondary shaft, a pinion fixedly mounted on the secondary shaft, a second pinion loosely mounted on the primary shaft, said two pinions being in constant inter-meshing relationship, an oil pump driven by the secondary shaft, a clutch actuatable by the oil pressure delivered by said pump, the elements of said clutch being movable relatively to one another and being secured respectively to the primary shaft and to the said second pinion loosely mounted on said primary shaft, a driven shaft in axial alignment with the secondary shaft and connected thereto by connecting means controlled by the load applied to said driven shaft and adapted to cause displacements thereof relative to the said secondary shaft, means actuated by said displacements of the driven shaft for regulating the oil pressure delivered by the said oil pump to effect the engagement and disengagement of the clutch in response to variations in the value of the load on said driven shaft, and means in said gear reductor for disengaging said gear reductor when the clutch is actuated to connect the said second pinion to the driving shaft.

2. An automatic variable speed transmission as defined in claim 1, further comprising manually operated means for varying the pressure of the oil delivered by said pump for disengaging the said clutch to effect re-engagement of the gear reductor when acceleration is desired at a time when said gear reductor is disengaged.

3. An automatic variable speed transmission as defined in claim 1, further comprising a torque converter having a stator comprising a free wheel connected to the driving shaft.

4. An automatic variable speed transmission as defined in claim 2, further comprising a torque converter having a stator comprising a free wheel connected to the driving shaft.

LEON SAIVES.

REFERENCES CITED

The following references are of record in the file of this patent:

UNITED STATES PATENTS

| Number | Name | Date |
|---|---|---|
| 942,913 | Keller | Dec. 14, 1909 |
| 1,837,978 | McGavern | Dec. 22, 1931 |
| 1,884,595 | Moxley | Oct. 25, 1932 |
| 2,252,042 | Sinclair | Aug. 12, 1941 |
| 2,480,933 | Jandasek | Sept. 6, 1949 |
| 2,529,129 | Blair | Nov. 7, 1950 |